United States Patent

[11] 3,558,855

| [72] | Inventors | Frank Stanek;<br>Joseph Pavelka, Jr., St. Louis, Mo. |
|---|---|---|
| [21] | Appl. No. | 724,170 |
| [22] | Filed | Apr. 25, 1968 |
| [45] | Patented | Jan. 26, 1971 |
| [73] | Assignee | The Toastswell Company<br>St. Louis, Mo.<br>a company of Missouri |

[54] ELECTRIC FOOD TOASTER
10 Claims, 10 Drawing Figs.

[52] U.S. Cl..................................................... 219/385,
99/329
[51] Int. Cl.............................................. F27d 11/00
[50] Field of Search............................................. 99/329,
391, 392, 400; 219/19.1, 19.01, 19.02, 385, 386,
428, 520, 521, 525, 536, 542, 546, 548

[56] References Cited
UNITED STATES PATENTS
1,900,249  3/1933  Miller et al. ................... 99/391

| 2,414,325 | 1/1947 | Newell ......................... | 219/521X |
| 2,491,829 | 12/1949 | Palmer et al. ................. | 99/391 |
| 2,545,404 | 3/1951 | Young........................... | 99/400 |
| 2,622,505 | 12/1952 | Olson et al..................... | 99/329X |

*Primary Examiner*—Bernard A. Gilheany
*Assistant Examiner*—Dewitt M. Morgan
*Attorney*—James L. Jackson ABSTRACT: An electrically energized toaster for toasting food substances such as bread and the like having elements and a thermostatically controlled mechanism for timing the toasting cycle. The heating elements are removable without the necessity of removing the cover of the unit so that the heating elements may be cleaned, repaired, or replaced by persons having little or no experience in the repair of toaster structures. The thermostatic controlled timing sequence is made variable by a slice carrier release mechanism which is actuated by a toggle linkage to achieve a greater range of toasting time than is ordinarily available in food toasters.

PATENTED JAN 26 1971

INVENTORS
FRANK STANEK
JOSEPH PAVELKA, JR.
BY
*James F. Jackson*
AGENT

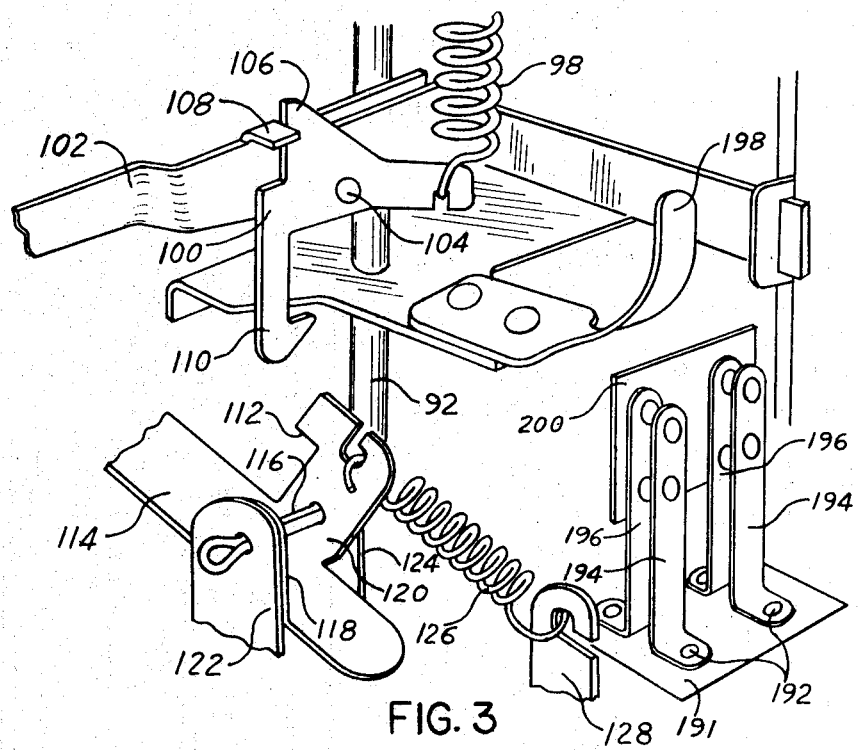
FIG. 3
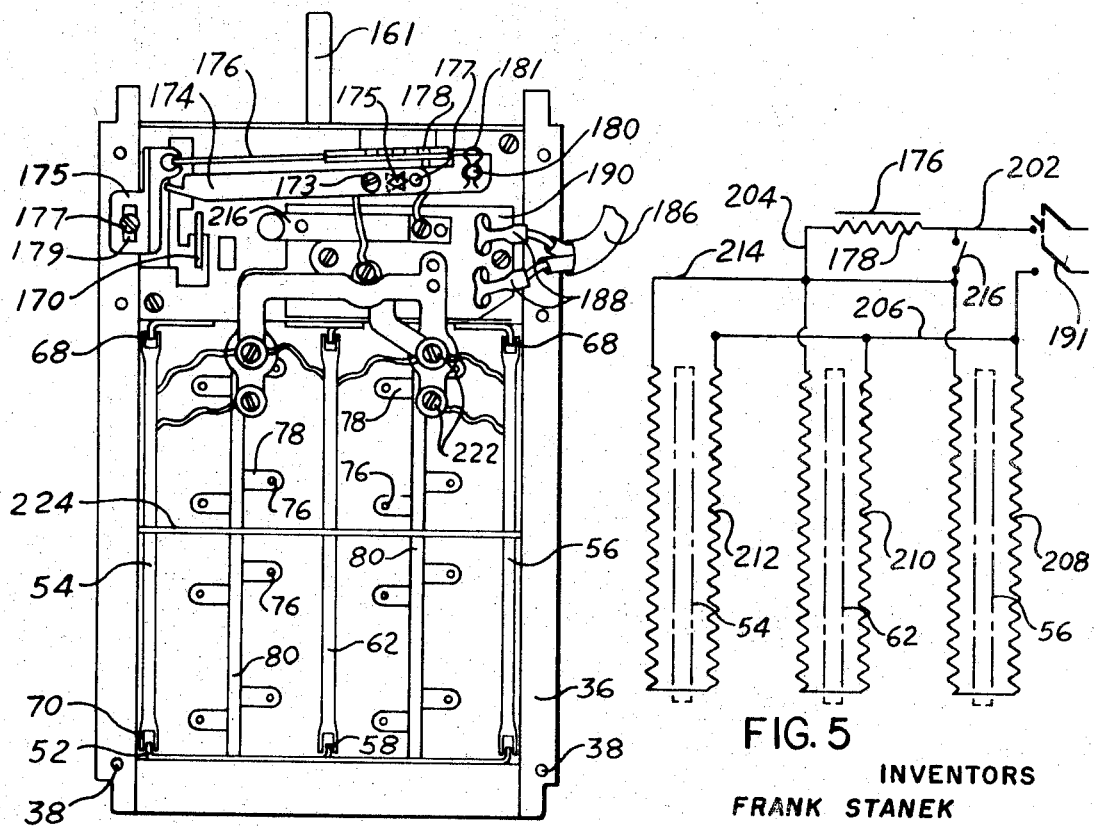
FIG. 4
FIG. 5
INVENTORS
FRANK STANEK
JOSEPH PAVELKA, JR.
BY
AGENT

INVENTORS
FRANK STANEK
JOSEPH PAVELKA JR.

BY *James Jackson*

AGENT

PATENTED JAN 26 1971 3,558,855

INVENTORS
FRANK STANEK
JOSEPH PAVELKA JR.
BY
James Jackson
AGENT

ELECTRIC FOOD TOASTER

BACKGROUND OF THE INVENTION

While electric toaster structures are quite complex in general the most frequent repair and general servicing operations are quite simple and might readily be accomplished if access to the toasting chamber of the toaster could be gained without removal of the toaster cover and if partial or substantial disassembly of the toaster were not necessary. Because most toaster structures are not susceptible to minor servicing without partial or substantial disassembly it is often necessary to carry the toaster to an appliance repair shop even for minor servicing and cleaning.

Virtually every toaster device presently on the market has a variable toasting sequence to control the color of the toast but these structures for the most part are limited in the degree of variability so that they are not readily adaptable to the wide range of food products presently available. For example a bread toaster may not be provided with sufficient variability in the toasting time sequence control to be adaptable for types of sliced food substances other than bread.

The instant invention has, therefore, as its primary object the provision of a novel toaster structure having heating elements which are readily removable without necessitating removal of the toaster cover from the chassis thereof.

It is an even further object of this invention to provide a novel food toaster structure having a toggle-actuated variable primary toasting sequence control for the achievement of a greater range, more accurately adjustable control than is ordinarily found in commercially available food toaster structures.

Among the several objects of this invention is contemplated the provision of a novel food toaster structure having a fully automatic toasting sequence.

Another object of this invention is the provision of a novel and improved toaster construction which is simple in nature, reliable in s use and low in cost.

Another object of our invention is the provision of a novel toaster construction having food slice guide members which are retained by the chassis of the toaster and which will not become inadvertently disassembled from the chassis even when the chassis and cover of the toaster are disassembled.

An even further object of this invention involves the provision of a novel toaster construction including access plates of unique construction which form bottom walls for the toaster and which are movable or readily removable for servicing of the toaster.

Other and further objects of this invention will become obvious to one skilled in the art upon an understanding of the illustrative embodiment about to be described or will become inherent upon employment of the invention in practice.

In the drawings, in which an illustrative embodiment of the invention is clearly set forth:

FIG. 3 is a fragmentary perspective view of the toaster chassis of FIG. 2 illustrating the food carrier slide and the slide actuated switch in detail.

FIG. 4 is a bottom view of the toaster chassis of FIG. 2 illustrating the physical detail of the electrical circuitry and the bimetal control structure of the toaster in detail.

FIG. 5 is a schematic illustration of the electrical circuitry of the toaster construction of this invention.

Figure 1:
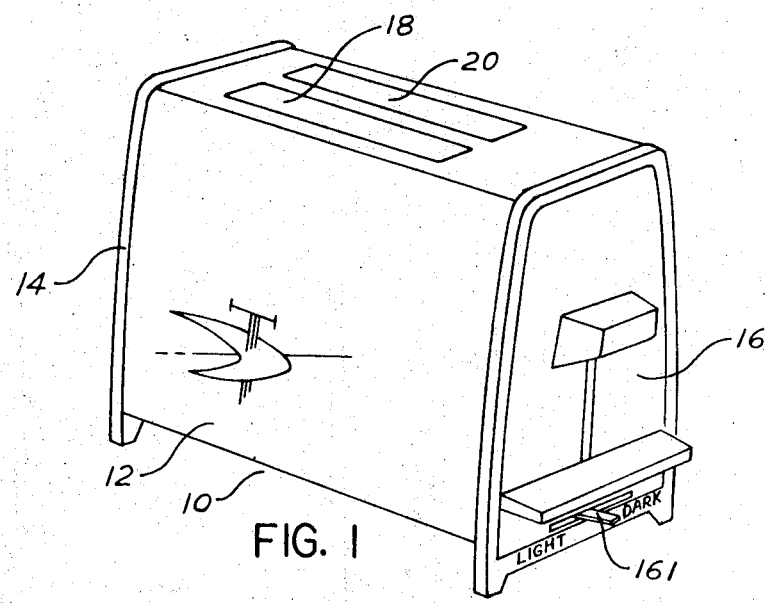
FIG. 1 is a perspective view of a toaster construction made in accordance with the spirit and scope of this invention.

Referring now to the drawings for a better understanding of the invention in FIG. 1 there is shown a toaster construction 10 comprising a housing 12 and two end walls 14 and 16 which interfit with the housing to form a protective enclosure. The housing is provided with a pair of elongated apertures 18 and 20 for receiving slices of food substance such as bread or the like.

Figure 2:
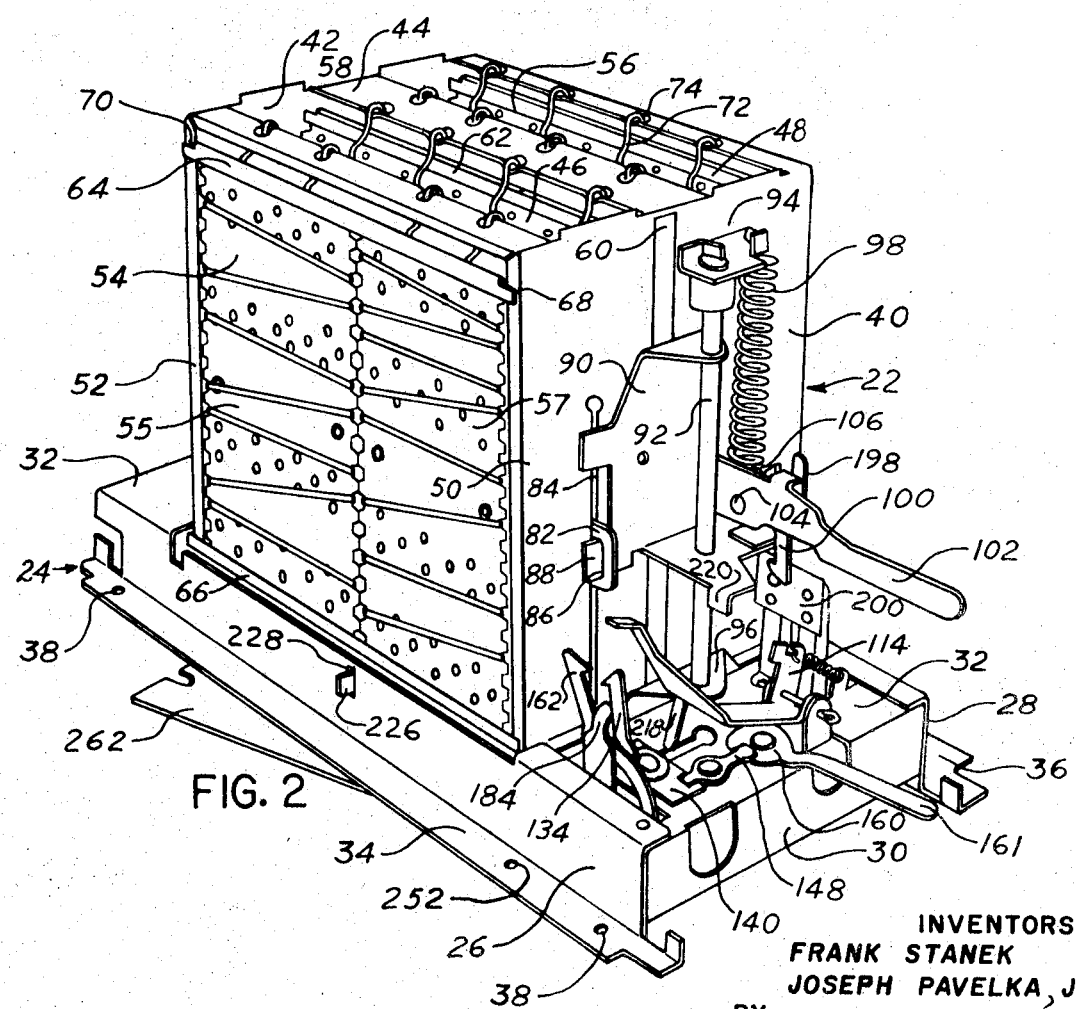
FIG. 2 is a perspective view of the chassis of the toaster construction of FIG. 1.

Within the protective enclosure is a chassis structure illustrated generally at 22 in FIG. 2 which includes a chassis base 24 having sidewalls 26 and 28, a front end wall 30, and a top wall 32. A pair of flanges 34 and 36 disposed at the lower end of the sidewalls 26 and 28 serve to establish connection between the chassis and the protective enclosure. Screws which extend through apertures 38 an in the flanges 34 and 36 are threadedly received by the cover 12 to positively fix the cover to the toaster chassis.

The toaster chassis included front and rear end plated 40 and 42 respectively which are connected at the upper extremities thereof by a top wall 44 preferably formed integrally with the sidewalls. A pair of generally parallel apertures 46 and 48 are formed in the top wall 44 and are located for registry with the apertures 18 and 20 in the cover 12.

The front wall 40 and the rear wall 42 of the toaster chassis are provided with opposed flanges 50 and 52 respectively which are preferably formed integrally with the end walls. The flanges 50 and 52 extend downwardly to a plane established by the lower flanges 34 and 36 and form guides for removable heating elements 54 and 56. The front and rear walls also define opposed central flanges 58 and 60 which are disposed coextensive with the flanges 50 and 52 and which form guides for a central heating element 62. The heating elements are each composed of two vertically oriented sheets of insulation material 55 and 57, such as mica, about which is wound a continuous resistance ribbon. The edges of the sheets of insulation material are provided with a series of evenly spaced toothlike protuberances which maintain the resistance ribbon in proper orientation about the insulation material. Two vertically disposed sheets are employed so that the resistance ribbon will not be required to span an exceptionally great distance thereby tending to prevent the resistance ribbon from becoming misoriented by heating and cooling over long periods of time. The upper and lower edges of each of the heating elements are provided with reinforcing members 64 and 66 which are strips of metal folded over the edges of sheets of insulation material. The reinforcing members 64 and 66 have bifurcated extremities, such as shown at 68 and 70 in FIG. 2, which are received about the guide flanges 50 and 52 to provide adequate lateral support for the heating elements.

A number of food slice guides 72 are received at the upper extremities thereof within apertures 74 defined in the upper wall of 44 of the chassis 24 and depend from the upper wall. The lower extremities of the guide members 72 are received within apertures 76 formed in a plurality of support fingers 78 of a movable food slice carrier members 80 in such manner that the slice carrier members 80 are guided by the guide members as they reciprocate within the heating chamber. The slice carriers 80 are guided laterally by guide extensions thereof which are received within guide slots formed in the front and rear walls 40 and 42 of the chassis 24.

Figure 10:
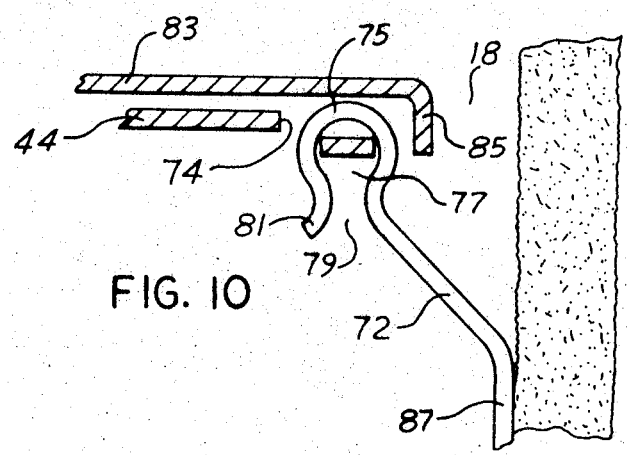
FIG. 10 is a fragmentary sectional view of the assembled toaster construction illustrating interlocking of the food slice guides to the chassis.

With reference now to FIG. 10, an important aspect of our invention concerns the specific structure of the food slice guides 72 and the cooperation thereof with the chassis and cover to achieve positive interlocking of the guides with the chassis construction without causing binding thereof. Each of the food slice guides is provided with a hook portion 75 formed by bending the guide member back upon itself at the upper extremities thereof in such manner as to define a hook opening 77 which is provided with a restriction 79 at the outer extremity thereof. The restriction 79 is of smaller dimension than the distance defined between the edge of the guide apertures 74 and the edge of the elongated openings in the top wall 44 of the chassis. Each of the hooks is provided with an outturned portion 81 which serves as a cam when the guide is assembled to the chassis. The out-turned portion engages the edge of the aperture ad and as the guide is forcibly urged downwardly the out-turned portion engages the edge of the aperture 74 and is urged outwardly. This causes the restriction to increase in size sufficiently to pass the top wall of the chassis and after this occurs the hook and restriction will return to their former shape and dimension. The hooks are therefore "snapped" into assembly with the chassis and thereby will tend to resist inadvertent disassembly therefrom.

The top wall 44 of the chassis is deformed between the aperture 74 and the parallel chassis apertures 46 or 48 forming a depression which receives the uppermost portion of the hook 75 thereby preventing the upper surface of the hook from extending substantially above the top wall 44 of the chassis. The top wall 83 of the cover 12 when in assembly with the chassis is in juxtaposed relation with the top wall of the chassis and overlies the upper portion of the hooks 75 thereby serving to positively limit upward movement of the food slice guides in the event the interlocking relation between the guides and the chassis should be overcome. The food slice openings 18 and 20 in the top wall 77 of the cover 12 are defined by depending flanges 85 which also serve to enclose the top portions of the food slice guides to protect the same from contamination by the food product. The guides 72 are bent adjacent the hooks 75 to provide a slice engaging portion 87 thereof which is disposed in substantially parallel relation with the depending flange portions 85 of the top wall 83 of the cover. This feature assures spacing of the food slice at all times from the flanges 79 and proper orientation of the food slice within the toasting compartment. Because of this novel construction it is not possible for the food slice guides to become inadvertently disassembled from the chassis nor may they become disoriented within the toasting compartment.

As shown in FIG. 2 the front guide extension 82 extends through the guide slot 84 and is provided with a slot 86 which receives an ear 88 of a slice carrier actuating slide 90. The slide 90 is carried by a guide rod 92 which is maintained in vertical disposition by upper and lower clips 94 and 96 respectively A tension spring member 98 is connected at the upper extremity thereof to the upper clip 94 and has its lower extremity connected to a slide release lever 100 which is connected to a slide actuator arm 102 by a pivot 104. The slide release lever 100 is biased in a clockwise direction by the spring 98 as illustrated in FIG. 2 and counterclockwise as illustrated in FIG. 3. A positioning stop 106 on the lever 100 is biased by the spring 98 into engagement with a stop tab 108 on the arm 102. In this position a hook 110 on the lever 100 is oriented for engagement with a shoulder 112 of a slide latch 114. The slide latch 114 is pivotally mounted by a pin 116 which extends through registered apertures in a pair of tabs 118 and 120 on the latch 114 and a pair of tabs 122 and 124 which are fixed to or formed integrally with the top wall 32 of the toaster chassis 24. A tension spring member 126 connected between the tab 120 and a tab 128 on the chassis wall 32 bisects the latch member 114 in a clockwise direction about the pivot pin 116 as shown in FIGS. 2, 3, and 6.

Figure 6:
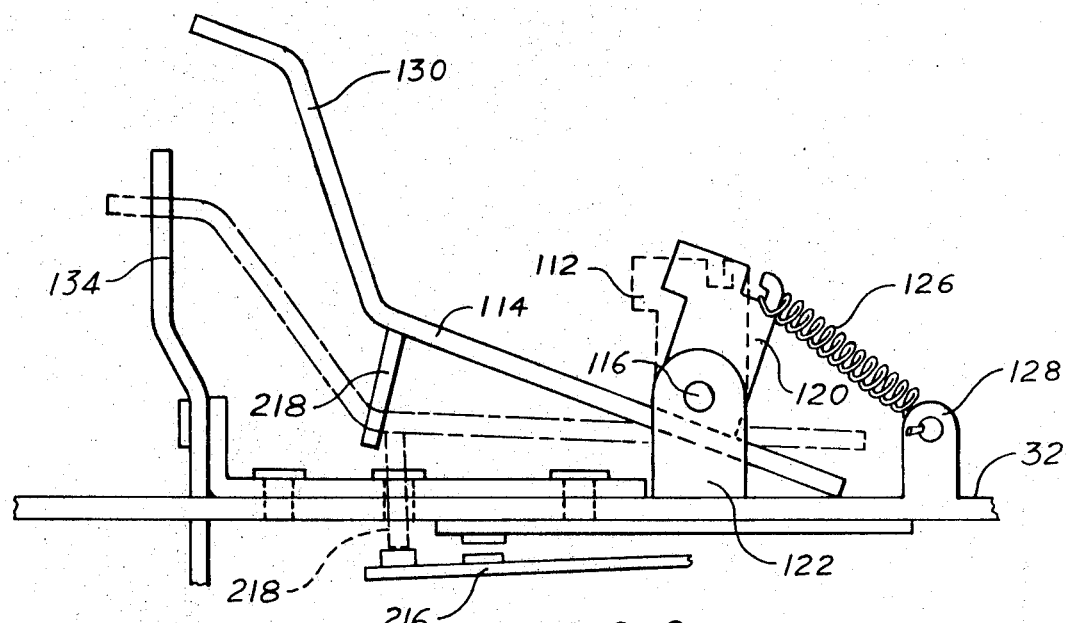
FIG. 6 is a fragmentary elevational view of the toaster chassis structure of FIG. 2 illustrating the slide latch mechanism in detail.

The latch 114 includes an offset arm 130 which, in the dash line position of the latch, as shown in FIG. 6 engages a shoulder 132 of a first offset arm release member 134. The release member 134 is connected by a pivot 136 to an upstanding tab 138 formed on a horizontal heat sequence timing slide member 140. The slide member 140 is provided with an elongated opening 142 through which a pin member 144 extends. A washer or keeper member 146 retained by the pin member 144 overlies the elongated opening 142 and prevents disassembly of the slide 140 from the top wall 32 of the chassis.

The slide member 140 is movable linearly with respect to the pin 144 within limits defined by the extremities of the elongated opening 142. A toggle link 148 is connected by a pivot 150 to the top wall 32 of the chassis 24 and is provided with enlarged extremities 152 and 154 which are received respectively within slots 156 and 158 formed by the slide member 140 and a pivoted toggle drive member 160 which is also carried by the top wall 32 of the chassis. Rotation of the toggle drive member about its pivot 162 causes the toggle link 148 to be revolved about its pivot 150 and by virtue of the extremity 152 of the toggle link and the slot 156 of the slide 140 this same movement induces linear movement to the slide 140. The toggle linkage therefore translate rotational movement of the toggle drive member 160 into linear movement of the slide 40.

For control of the heat timing sequence a second offset arm release member 162 is connected by a pivot 164 to a tab member 166 either connected to or formed integrally with the top wall 32 of the chassis. The release member 162 is provided with a shoulder 168 at the upper extremity which is disposed for engagement with the offset arm 130 of the slide latch 114. The shoulder 168 is slightly higher than the should 132 on the first release member 134 thereby causing the arm 130 to be controlled by an escapementlike movement during control of the heat timing sequence. This movement is discussed in greater detail hereinbelow.

The offset arm release members 134 and 162 each have tail portions 170 and 172 respectively which extend in opposed relation below the top wall 32 of the chassis and are adapted to engage opposite sides of a movable timer control arm 174 shown in greater detail in FIG. 4. Movement of the control arm 174 is controlled by a bimetal element 176 which is heated by an electrical resistance heating ribbon or wire 178 wound about the bimetal element. The control arm 174 is rotatably mounted to the underside of the top wall 32 by a pivot member 180 and is movable within limits controlled by heating and cooling of the bimetal element 176. A lock spring 181 secures the arm 174 to the pivot 180. The heating sequence of the toaster may be adjusted by loosening a lock screw 173 and by inserting a screwdriver or other suitable implement into a double diamond opening 175 to cause pivoting of the arm 174 about a pivot 177.

Figure 7:
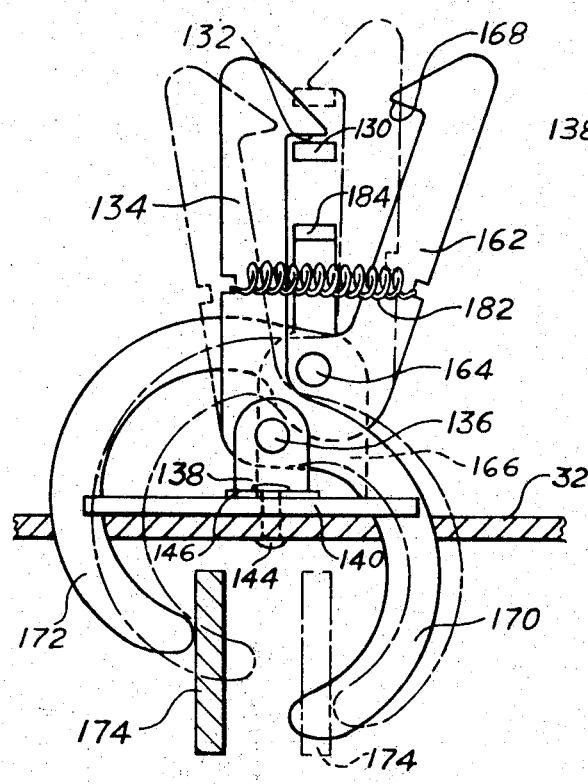
FIG. 7 is a fragmentary elevational view of the slide latch release mechanism of the toaster construction of the invention with the top wall and the time sequence control arm shown in section. This view also depicts operational positions of the slide latch mechanism.
Figure 8:
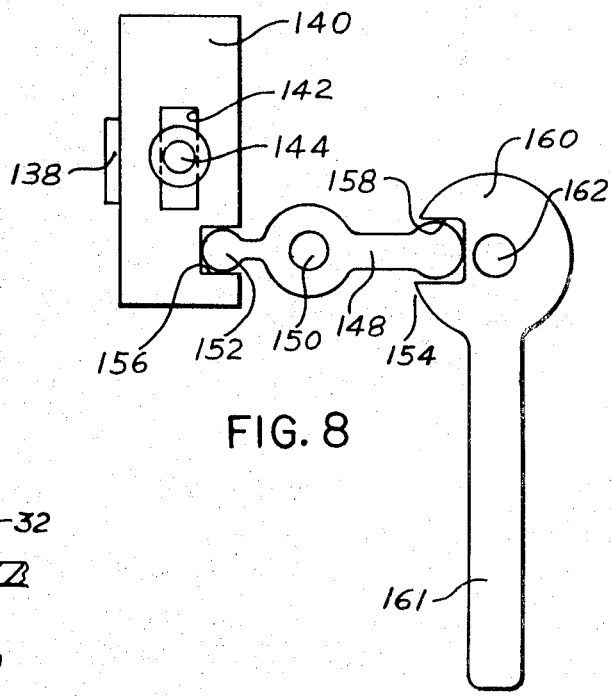
FIG. 8 is a fragmentary plan view of the toaster chassis of FIG. 2 illustrating the toggle linkage which is employed for adjustment of the release position of the latch release mechanism of the invention.

A spring member 182 is connected between the release members 134 and 162 above the top wall 32 and serve to bias both the top portions and the tail portions of the release members toward one another and maintain one of the tail portions 170 and 172 in engagement with the control arm 174. For example, as illustrated in FIG. 7 the offset arm release member 134 is biased into engagement with a stop element 184 extending upwardly from the tab member 166 thereby preventing the release member 134 from pivoting sufficiently to maintain the tail portion 170 thereof in engagement with the control arm 174. The spring member therefore urges the second offset arm release member toward the release member 134 causing the tail member to be biased into engagement with the control arm 174. As the control arm is moved toward the tail portion 170 of the release member 134 upon heating of the bimetal elements 176 of the spring member 182 will cause the tail portion 172 of the offset arm 162 to maintain engagement with the control arm 174 thereby pivoting the upper portion of the release member 162 toward the stop 184. As the release member 162 is moved sufficiently to engage the stop 184 contact is made between the control arm 174 and the tail portion 170 of the release member 134. Further movement of the control arm 174 forces the tail portion to pivot about its pivot 136 thereby pivoting the upper portion of the release member away from the stop 184 causing it to release the offset arm 130. Upon being released, the offset arm 130 will be pivoted by its spring 126 about the pivot 116 thereby causing the offset arm 130 to be biased into engagement with the shoulder 168 of the release member 162. This escapementlike movement effects release of the offset arm 130 by the release member 134 to a position of restraint by the second release member 162.

Assuming not that the electrical circuit to the bimetal heating ribbon 172 is deenergized and that the bimetal element 176 begins to cool, the direction of movement of the control arm will be reversed thereby causing it to move toward the solid line position thereof as shown in FIG. 6. This causes the release member 162 to pivot away from the stop member 184 and causes the shoulder 168 to release the offset arm 130. After the offset arm is released, it will be rotated by its spring member 126 to the FIG. 2 and 6 position thereof thereby releasing engagement between the hook 110 of the slide release lever 100 and the shoulder 112 of the slide latch 114. This movement releases the food carrier slide 90 allowing the spring 98 to move the slide to its upper most position and presenting the slices of food substance for removal from the toaster.

Adjustments in timing of the heating sequence may be made by manual adjustment of the toggle drive member 160. An arm 161 which extends outwardly beyond the end wall 16 of the toaster is manually moved to a desired position to achieve desired toasting of a food product. As indicated above, rotation of the toggle drive member 160 acts through the toggle link 148 to impart linear movement to the slide member 140. Linear movement of the slide 140 causes pivotal movement of the first offset arm release member 134 since the pivot 136 is linearly adjusted relative to the stop member 184. The pivotal movement of the release member 134 varies the position of the tail member 170 thereof relative to the control arm 174. Since the control arm will move at a relatively constant rate during heating of the bimetal member 176, adjustment of the distance between the tail portion 170 of the release member 134 and the control arm 174 effectively achieves a corresponding adjustment in the length of the timing sequence. Adjustment of the timing sequence in this manner is a fine adjustment such as would be made for the toasting of a food substance such as bread between dark and light color.

For adjustment of the control arm, an adjustment slide member 175 is retained on the chassis and may be varied by loosening an adjustment screw 177 and moving the adjustment member linearly within limits defined by an elongated slot 179. Linear movement of the adjustment member 175 effects pivoting of the control arm 174 about its pivot 180, thereby varying the initial position of the control arm relative to the tail portion 170 of the release member 134. Adjustment of this nature will generally be made at the factory to assure proper adjustment of the heating sequence control.

With reference now to FIGS. 3, 4, and 5, electrical circuitry for the food slice toaster includes an electric cord 186 having a pair of electrical conductors and communicated with a source of electrical energy in conventional manner, and is connected to the toaster chassis by a pair of clips 188 each connecting one of the conductors of the cord to a tab fixed to an insulating plate 190. The tabs are in electrical connection through brad members 192 with a normally open switch 191 which includes two pairs of flexible conductor members 194 and 196 which are normally disposed in spaced relation. A switch actuating arm 198 is carried by the slide member 90 and is disposed for engagement with a wear plate 200 of insulating material which is fixed to two of the flexible conducting members. When the slide 90 is depressed to its lower position with the hook 110 engaging the shoulder 112 and retaining the slide in the depressed position, the switch actuating arm 198 will engage the wear plate 200 and bias the conductors 194 into engagement with the conductors 196 thereby closing the circuit and energizing the toaster circuitry.

As illustrated schematically in FIG. 5, a conductor 202 is connected to the resistance ribbon 178 which is in turn connected to a conductor 204. A conductor 206 forming the other lead of the switch 191 is connected with resistance ribbons 208, 210, and 212 of the three heating elements of the toaster. Another conductor 214 is also disposed in electrical connection with the resistance ribbons of the heating elements to complete the circuits therefor. A normally closed shunt switch 216 is connected across the conductors 202 and 214 and serves when closed to shunt out the resistance ribbon 178 to allow the same to cool while heating is continued through the resistance ribbons of the three heating elements. The switch 216 is opened by engagement thereof by a switch actuating finger 218 which depends from the slide latch 114 in the manner shown in broken lines in FIG. 6.

With reference particularly to FIG. 5 and 6 closing of the switch 191 and opening of the switch 216 will occur simultaneously since movement of the slide 90 to its lowermost position causes the switch actuating arm 198 to close the switch 191 and also causes a tab member 220 to engage the slide latch 114 moving the slide latch to the broken line position thereof as illustrated in FIG. 6. With the offset arm 130 of the slide latch 114 in engagement with the shoulder 132 of the offset arm release member 134, the depending finger 218 of the slide latch 114 engages the normally closed switch 216 moving it to its open position. With the switch 191 closed and switch 216 open, electrical current to the resistance windings 208, 210, and 212 must pass through the heating ribbon 178 thereby causing the bimetal 176 to be heated. As the bimetal element 176 is heated, it will move rather slowly from the solid line position thereof in FIG. 7 to the broken line position thereof. Upon reaching the broken line position the control arm 174 will engage the tail portion 170 of the release member 134 and will rotate the release member to its broken line position effecting release of the offset arm 130. The offset arm 130 will be pivoted upwardly to its broken line position into engagement with the shoulder 168 of the second offset arm release member 162 thereby causing the depending finger 218 to move upwardly sufficiently to allow the shunt switch 216 to close. Upon closure of the shunt switch 216 electrical current bypasses the resistance ribbon 178 thereby allowing the resistance ribbon and the bimetal member to cool while heating of the food product is continued through energization of the heater element resistance ribbons 208, 210, and 212. As the bimetal element 176 cools, the control arm 174 will reverse its direction of movement and will move back to the solid line position thereof as shown in FIG. 7. The control arm will engage the tail portion 172 of the release member 162 pivoting the release member to a position releasing the offset arm 130. This allows the slide latch 114 to be biased to the solid line position thereof as shown in FIG. 6, causing the shoulder 112 of the latch 114 to release the hook 110 of the release lever 100 thereby allowing the tension spring 98 to raise the slide 90 to its uppermost position. As the food carrier slide 90 is moved upwardly the switch actuating arm 198 disengages from the wear plate and insulation member 200 thereby allowing the resilient switch actuating arms 94 to move out of contact with the resilient switch actuating arms 196 thereby deenergizing the resistance ribbons 208, 210, and 212 of the heating elements. It is apparent therefore that the resistance ribbons of the heating elements are energized only when the slide 90 is latched to the slide latch 114.

At any time during the heating sequence toasting may be interrupted simply by manually raising the slide actuator arm 102. This pivots the arm 102 with respect to the slide 90 and, through engagement between the stop tab 108 on the arm 102 and the positioning stop 106 of the slide release lever 100, causes the hook 110 to release its restraining engagement with the shoulder 112 of the slide latch 114.

With reference particularly to FIGS. 2 and 4 an important aspect of the instant invention concerns the easy removability of the heating elements 52, 56, and 62 for repair, replacement, or for general cleaning and the like. Access to the heating chamber of the toaster is gained by movement of a crumb collector plate which is pivotally connected to the toaster chassis and which forms a bottom wall of the toaster. There is no necessity therefore of removing the toaster cover to gain access to the heating chamber. Connection between the resistance ribbons of the heating elements and the electrical circuitry of the toaster is maintained by four screws 222 which are threadedly received within appropriate electrical conducting elements. The resistance ribbons may be disconnected from the electrical circuitry simply by loosening the four screws 222. A soft metal supporting bar member 224 extends transversely across the toaster chassis below the heater elements 54, 56, and 62 and has tabs 226 at each extremity thereof which are received within apertures 228 formed in the sidewalls 26 of the toaster chassis 24. The supporting bar 224 ordinarily supports the heating elements in their proper position within the toaster chassis. To effect removal of the heating elements it is only necessary to bend the soft metal supporting bar 226 sufficiently to disengage one of the tabs 226 from one of the apertures 228. The supporting bar may then be removed thereby allowing the heating elements to slide downwardly along their supporting flanges 50, 52, and 58, and 60 until the bifurcated extremities 68 and 70 of the heating elements become disengaged from the supporting flanges.

Replacement of the heating elements is accomplished simply by engaging the bifurcations 68 and 70 of the reinforcing members 64 with the respective support flanges of the toaster chassis and sliding the heating elements into their proper position. The support bar 224 may then be placed under the heating elements and manually straightened to engage the tabs 226 within the apertures 228. The resistance ribbons then may be connected to the electrical circuitry by tightening the screws 222 on the resistance ribbons.

In the alternative, the supporting bar 224 may be composed of a flexible springlike material which may be manually deformed by bending upon removal or replacement but which springs back to a straight condition upon release.

Figure 9:
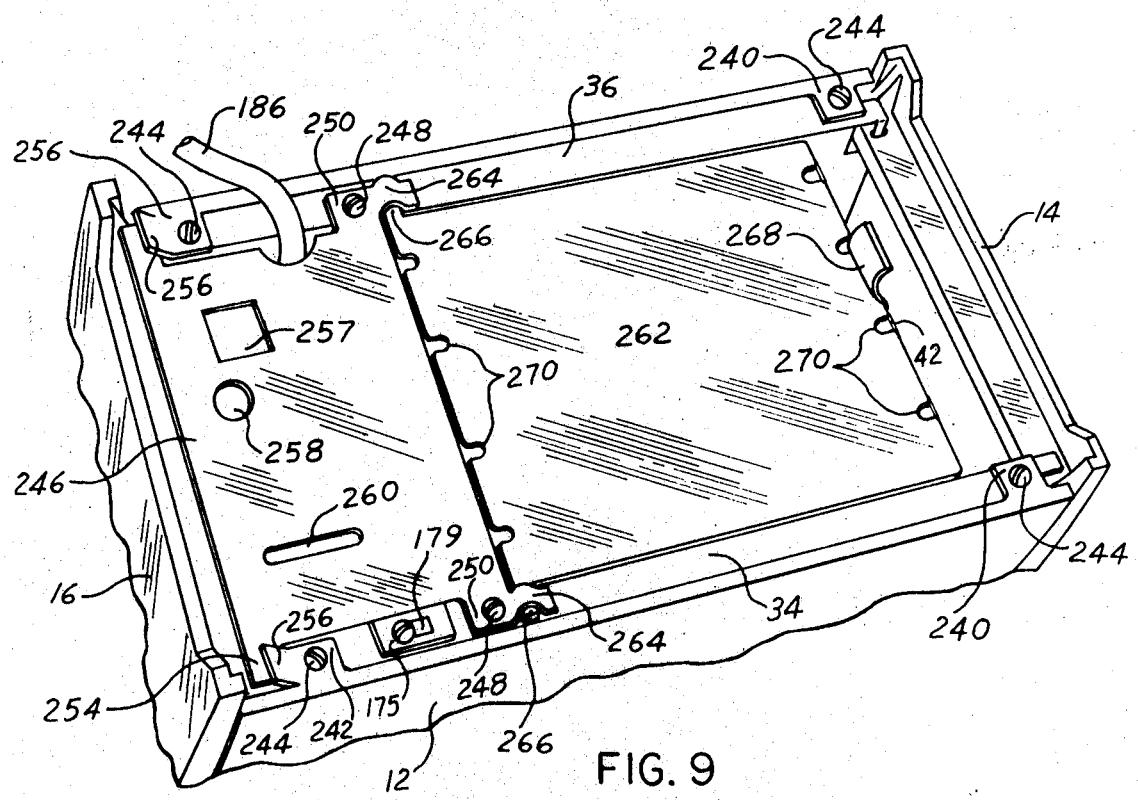
FIG. 9 is a perspective view of the bottom of the toaster construction illustrating the access plate structure in detail.

Referring now to FIG. 9, which illustrates the bottom of the toaster construction the cover 12 is provided at its lower extremity with rear connection tabs 240 and front connection tabs 242 which are disposed substantially parallel with the flanges 34 and 36. Screws 244 extend through apertures formed in the front and rear connection tabs and are threadedly received within the apertures 38 in the flanges 34 and 36 to connect the cover 12 to the chassis. An easily removable access plate 246 defining a bottom closure for the toaster chassis is connected to the toaster chassis by screws 248 which extend through screw apertures formed in a pair of tabs 250 and are received within screw apertures 252 formed in the flanges 34 and 36. A pair of support tabs 254 engage angular extensions 256 of the forward tabs 242 and serve to retain the access plate 246 against displacement from a substantially parallel relation with the flanges 34 and 36 of the toaster chassis. Removal of the access plate is accomplished simply by removal of the flanges screws 248 as is clearly evident from the drawings. The access plate 246 is provided with an inspection opening 257 and an adjustment opening 258 so that minor adjustment of the heating sequence control mechanism may be accomplished without necessitating removal of the access plate. A calibrated elongated opening 260 is formed in the access plate and is utilized to accomplish proper positioning of the control arm 174.

A toasting chamber access plate and crumb tray 262 is connected to the chassis and forms a bottom closure for the toasting chamber. A pair of curved pivot tabs 264 formed on the access plate 246 and cooperate with the flanges 34 and 36 to define pivot apertures which receive pivot members 266 formed on the access plate 262 and thereby establish pivotal connection between the access plate 262 and the toaster chassis. A spring catch 268 is retained on the rear wall of the chassis and is adapted to engage and restrain the free extremity of the pivoted access plate 262 in the closed position thereof. To open the access plate 262 for servicing of the heating elements or removal of crumbs and the like it is only necessary to apply sufficient force to overcome the spring catch to free the plate 262 for movement about its pivots. The access plate 262 is also completely removable from the chassis simply by loosening or removal of the two screws 248. It is therefore clearly apparent that both of the access plates 246 and 262 may be removed from the chassis by removing screws 248 thereby promoting simplicity of design and ease of servicing.

The access plate 262 is also provided with a plurality of slots 270 which cooperate with the front and rear walls 40 and 42 of the toaster chassis to define a plurality of air circulation openings which provide circulation of cool air along the front and rear walls 40 and 42 to maintain them as cool as possible during the toasting process in addition to providing optimum heated air circulation within the toasting compartment to achieve optimum toasting of the food product.

In view of the foregoing, it is clearly evident that the novel food product toaster of this invention involves simple and reliable structure for toasting a wide range of food products of varying toasting requirements. To accomplish this the invention provides for primary adjustment of the toasting sequence through a novel manually adjustable pivotal heat sequence selector which is operative through a novel toggle linkage which translates the pivotal movement into linear movement of a timing slide member. The timing slide upon being moved linearly by the toggle linkage effectively positions a latch release mechanism for engagement with a bimetal actuated control arm. The controllable distance between the control arm and the latch release mechanism provides a wider range of toasting capability than is ordinarily available in food product toasters. For further variance of the toasting range to the instant invention the control arm of the toaster is also adjustable by means of a secondary adjustment structure. Through selective manipulation of either the primary or secondary toasting sequence adjustments there is provided an extremely wide range of toasting capability which make this invention capable of tasting a wide variety of food products.

An escapementlike mechanism effectively controls energization of a resistance ribbon which heats a bimetal control arm actuating member to effect automatic heat sequence operation of the toaster. Upon depression of the toaster food carrier slide the resistance ribbons of both the heating elements and the bimetal heat sequence control member become energized. After a period of heating determined by the time required for movement of the bimetal actuated control arm to move into engagement with the first latch release member, the resistance ribbon for the bimetal member will be deenergized but the heating element resistance ribbon will remain energized to continue the toasting sequence. The slide latch will be released through actuation of a second release member by the control arm upon cooling of the bimetal member, thereby allowing the food carrier slide to raise the food product through the elongated apertures 18 and 20 in the toaster cover. The heating elements are deenergized by raising of the food carrier slide 90 from its lowermost position.

This invention effectively promotes minor servicing by relatively inexperienced persons. By gaining access to the heating elements through the pivoted bottom wall of the toaster, any accumulation of food particles may be effectively removed and the interior of the heating chamber may be cleaned. By simple removal of the heating element support bar and loosening of the resistance ribbon screws the heating elements may be simply removed to allow more thorough cleaning of the walls of the heating chamber. Moreover, the heating elements themselves may be simply removed in this manner for repair, cleaning, or replacement. The electrical timing sequence control mechanism is also readily accessible for cleaning, adjustment, or repair by removal of a access plate thereby further promoting ease of serviceability of the toaster construction. In addition, the unique interconnection between the food slice guides and the top wall of the chassis effectively prevents inadvertent disassembly of the guide even when the enclosure has been removed from the chassis.

It is readily apparent, therefore, that the several objects of this invention are achieved and other advantageous results are effectively attained by the novel food toaster construction described hereinabove.

While the preferred embodiment of this invention has been illustrated and described herein, it is obvious that various

We claim:

1. An electric toaster construction comprising an enclosure having at least one elongated aperture formed therein, a chassis disposed within the enclosure and having at least one elongated aperture therein disposed in registry with said enclosure aperture, said toaster construction having electric circuit means, a plurality of heating elements being loosely positioned within said chassis, electrically energized heating means carried by each of said heating elements and being connected to said electrical circuit means, guide means maintaining said heating elements against misalignment relative to said chassis, opposed support apertures formed in said chassis, a removable flexible support bar extending across said chassis transversely of said heating elements and normally supporting said heating elements above the bottom portion of said chassis, said electrically energized heating means being disconnectable from said electrical circuitry and said support member being removable by flexing thereof to disconnect the extremities thereof from said support apertures whereby said heating elements may be removed from said toaster without necessitating the removal of said enclosure from said chassis.

2. An electric toaster construction as set forth in claim 1; said chassis having a top wall defining at least one elongated aperture disposed for registry with said aperture in said enclosure, a plurality of guide apertures formed in said top wall about said elongated aperture, a plurality of food slice guides depending into said chassis one from each of said guide apertures, the upper extremities of each of said guides being bent back upon itself to form a hook and defining a hook opening of smaller dimension than the distance between said guide apertures, each of the hooks extending downwardly through said guide apertures and being positively maintained in assembly with said chassis by cooperation between said hook opening and the guide apertures to prevent inadvertent disassembly therefrom.

3. An electric toaster construction as set forth in claim 1; said toaster chassis defining a bottom access opening of sufficient size to permit passage of said heating elements therethrough, means forming a cover for said access opening, said heating elements being removable through said access opening for servicing.

4. An electric toaster construction as set forth in claim 1; said guide means comprising a pair of generally parallel flanges on said chassis for each of said heating elements, bifurcations defined by said heating elements and being received by said flag flanges to positively maintain alignment of said heating elements within said chassis.

5. An electric toaster construction as set forth in claim 3; said heating elements having upper and lower reinforcing members having bifurcated extremities, said bifurcated extremities being received by said parallel flanges.

6. An electric toaster construction as set forth in claim 5; said guide means comprising pairs of generally parallel flanges on said chassis, said heating elements each having bifurcated tabs slidably engaging said flanges.

7. An electric toaster construction as set forth in claim 6; said support means comprising a flexible support bar disposed beneath said heating elements and having the extremities thereof received within apertures formed in said chassis, said support bar being removable by bending the same to disconnect it from said apertures thereby allowing said heating elements to slide along said parallel flanges for removal through said bottom opening.

8. An electric toaster construction as set forth in claim 6; said heating elements comprising one or more sheets of insulation material having a plurality of toothlike protuberances defining edges thereof, said resistance ribbons being wound about said insulation material and being supported by said protuberances reinforcing means for said heating elements said reinforcing means having bifurcations at each extremity thereof for receiving said flanges in guiding relationship.

9. An electric toaster mechanism comprising an enclosure, a toaster chassis fixedly received within said enclosure and defining a toasting compartment and a circuitry control compartment, a plurality of electrically energized heating elements disposed within said toasting compartment, electrical control circuitry for said toaster mechanism disposed within said circuitry control compartment, electrically energized heating means carried by each of said heating elements and being electrically connected to said electrical control circuitry, said chassis defining bottom access opening means for said toasting compartment and said circuitry control compartment, access cover means for said bottom access opening means, said access cover means comprising a first access plate for said toasting compartment and a second access plate for said circuitry control compartment, means releasably retaining said first and second cover plates in a position closing said access openings, said access cover means being readily movable whereby access may readily gained to said circuitry control and toasting compartments without necessitating removal of said enclosure from said chassis.

10. An electric toaster mechanism as set forth in claim 9; said second cover plate being removably connected to said chassis and cooperating with said chassis to define a pivot means, one end of said first access plate being pivotally retained by said pivot means, catch means carried by said chassis, the other end of said second access plate being receivable by said catch means to secure said second access plate to the closed position thereof.